United States Patent
Huang et al.

(10) Patent No.: US 12,014,176 B2
(45) Date of Patent: Jun. 18, 2024

(54) APPARATUS AND METHOD FOR PIPELINE CONTROL

(71) Applicant: Realtek Semiconductor Corp., HsinChu (TW)

(72) Inventors: Kuan-Lin Huang, HsinChu (TW); Chen-Hsing Wang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/903,057

(22) Filed: Sep. 6, 2022

(65) Prior Publication Data

US 2023/0083375 A1    Mar. 16, 2023

(30) Foreign Application Priority Data

Sep. 9, 2021   (TW) ................................ 110133582

(51) Int. Cl.
*G06F 9/30*     (2018.01)
*G06F 9/54*     (2006.01)

(52) U.S. Cl.
CPC ........ *G06F 9/3001* (2013.01); *G06F 9/30043* (2013.01); *G06F 9/30098* (2013.01); *G06F 9/544* (2013.01)

(58) Field of Classification Search
CPC .................................................. G06F 9/3001
See application file for complete search history.

(56) References Cited

U.S. PATENT DOCUMENTS

2008/0313422 A1*  12/2008  Le ..................... G06F 9/3851
                                                     712/E9.001
2009/0113170 A1*  4/2009  Abdallah ............ G06F 9/30123
                                                     712/E9.016

FOREIGN PATENT DOCUMENTS

TW             201232394 A1      8/2012

* cited by examiner

*Primary Examiner* — Michael J Metzger
(74) *Attorney, Agent, or Firm* — Winston Hsu

(57) ABSTRACT

An apparatus and a method for pipeline control are provided. The apparatus includes a preload predictor, an arithmetic logic unit (ALU) and a data buffer. The preload predictor is configured to determine whether a load instruction conforms to at least one specific condition, to generate a preload determination result. The ALU is configured to perform arithmetic logic operations, and the data buffer is configured to provide data for being used by the ALU. When the preload determination result indicates that the load instruction conforms to the at least one specific condition, the data buffer fetches preload data from a cache memory according to information carried by the load instruction and stores the preload data in the data buffer, where the preload data is data requested by a subsequent load instruction.

16 Claims, 8 Drawing Sheets

APPARATUS AND METHOD FOR PIPELINE CONTROL

BACKGROUND OF THE INVENTION

1. Field of the Invention

The present invention is related to instruction pipelines, and more particularly, to an apparatus and a method for pipeline control.

2. Description of the Prior Art

A memory organization architecture of an electronic device may comprise multiple layers such as registers, cache memories, main memories and auxiliary memories. The memory layer that is closest to a central processing unit (CPU) may have the fastest access speed but the smallest storage space, whereas the most external layer has the slowest access speed but the largest storage space. Access speed of the layers from fastest to slowest is, in order, the registers, the cache memories, the main memories and the auxiliary memories. Storage space of the layers from largest to smallest is, in order, the auxiliary memories, the main memories, the cache memories and the registers.

When operating under an instruction pipeline architecture, the CPU may load data located in a cache memory into a register via a load instruction, in order to allow the following instruction(s) to obtain this data quickly. After executing the load instruction, multiple cycles may be required to make the data from the cache memory be ready in the register; this results in the execution of some instructions needing to be delayed such that a "bubble" may occur in the pipeline schedule, which lowers the performance of the CPU operating under the instruction pipeline architecture. Current CPUs utilize deeper pipeline stages to achieve higher clock rates. The deeper the pipeline stages, the greater the severity of the above-mentioned problem.

Thus, there is a need for a novel method and apparatus, which can optimize the performance of the instruction pipeline without introducing any side effect or in a way that is less likely to introduce side effects.

SUMMARY OF THE INVENTION

An objective of the present invention is to provide an apparatus and a method for pipeline control, in order to solve the problem of the related art.

At least one embodiment of the present invention provides an apparatus for pipeline control. The apparatus comprises a preload predictor, an arithmetic logic unit (ALU) and a data buffer, wherein the data buffer is coupled to the preload predictor and the ALU. The preload predictor is configured to determine whether a load instruction conforms to at least one specific condition, for generating a preload determination result. The ALU is configured to perform arithmetic logic operations, and the data buffer is configured to provide data for being used by the ALU, wherein speed of the ALU fetching data from the data buffer is faster than speed of the ALU fetching data from a cache memory. More particularly, when the preload determination result indicates that the load instruction conforms to the at least one specific condition, the data buffer fetches preload data from the cache memory according to information carried by the load instruction and stores the preload data in the data buffer, wherein the preload data is data requested by a subsequent load instruction.

At least one embodiment of the present invention provides a method for pipeline control. The method comprises: utilizing a preload predictor to determine whether a load instruction conforms to at least one specific condition, to generate a preload determination result; in response to the preload determination result indicating that the load instruction conforms to the at least one specific condition, utilizing a data buffer to fetch preload data from a cache memory according to information carried by the load instruction and store the preload data in the data buffer, wherein the preload data is data requested by a subsequent load instruction; and utilizing the data buffer to provide the preload data to an ALU for performing arithmetic logic operations, wherein speed of the ALU fetching data from the data buffer is faster than speed of the ALU fetching data from the cache memory.

The apparatus and the method provided by the embodiments of the present invention can effectively eliminate or reduce stall cycles caused by load-use instruction pairs based on spatial locality and temporal locality. More particularly, the embodiments of the present invention will not greatly increase additional costs. Thus, the present invention can solve the problem of the related art without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Cache memories are memories which can be accessed quickly, and are configured to store data or instructions which are recently used or frequently used. In order to satisfy the requirement of fast access, a cache memory can be constituted by static random access memories (SRAMs). When an access address is received, the SRAMs still need to latch this access address first in order to respond with corresponding data during a next cycle.

Figure 1:
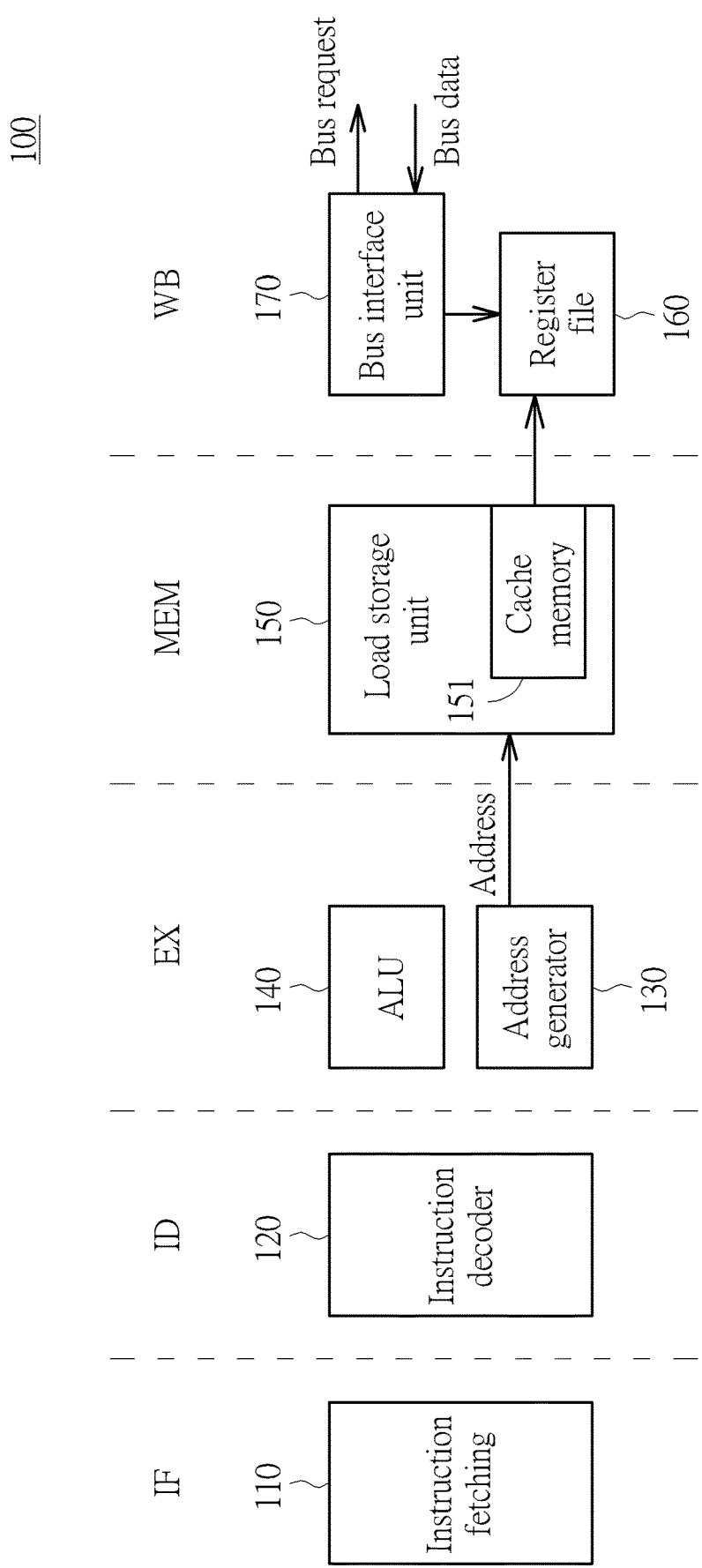
FIG. 1 is a diagram illustrating an apparatus operating under instruction pipeline architecture according to an embodiment of the present invention.

FIG. 1 is a diagram illustrating an apparatus 100 such as a central processing unit (CPU) operating under an instruction pipeline architecture according to an embodiment of the present invention. In this embodiment, the instruction pipeline architecture may be a five-stage pipeline, which comprises an instruction fetching (IF) stage, an instruction decoding (ID) stage, an instruction execution stage, a memory access stage and a data write back stage, where the above stages are labeled, respectively, "IF", "ID", "EXE", "MEM" and "WB" in figures for brevity. The apparatus 100 may utilize an instruction fetching module 110 (labeled "Instruction fetching" in figures) which operates to first obtain an instruction in the instruction fetching stage. The instruction decoding stage may then be entered. In the instruction decoding stage, the apparatus 100 may utilize an instruction decoder 120 to decode this instruction to obtain information carried by this instruction (such as an instruction type, a base address, an offset, etc.). The instruction execution stage may then be entered. In the instruction execution stage, if this instruction is a load instruction, the apparatus 100 may utilize an address generator 130 to generate an access address according to the base address and the offset carried by this instruction. The memory access stage may then be entered. If this instruction is an arithmetic instruction, the apparatus 100 may utilize an arithmetic logic unit (ALU) 140 to perform arithmetic logic operations such as operations corresponding to the arithmetic instruction. In the memory access stage, the apparatus 100 may fetch data corresponding to the access address from a load storage unit 150 (e.g. from a cache memory 151 within the load storage unit 150). The data write back stage may then be entered. In the data write back stage, the apparatus 100 may write the fetched data back to the memory which is the closest to the CPU, such as a register file 160, where it can be used by subsequent instructions. If the cache memory 151 is not hit (e.g. the cache memory 151 does not store the data requested by the load instruction), the apparatus 100 may utilize a bus interface unit 170 to send a bus request outside the apparatus 100 in the data write back stage, in order to obtain the data requested by the load instruction (e.g. the bus data shown in FIG. 1) from external memories such as hard disk drives, solid-state drives or externally-connected auxiliary memories.

In the embodiment of FIG. 1, although a load instruction may obtain data from the cache memory 151 in the memory access stage, if a certain arithmetic instruction is executed back-to-back with the load instruction (e.g. the arithmetic instruction occurs immediately after the load instruction), this arithmetic instruction still needs to wait until a next cycle (e.g. wait until the load instruction enters the data write back stage) in order to be able to use the data obtained from the cache memory 151.

TABLE 1

| Operation | Instruction |
| --- | --- |
| Load | load r0, [r8]; |
| Add | add r5, r0, #8; |
| Load | load r1, [r9]; |

Table 1 is an example of an instruction set, where the instruction shown in a first row of Table 1 (referred to as "first load instruction" for brevity) illustrates loading data of an address [r8] within the cache memory 151 into a register r0, the instruction shown in a second row of Table 1 (referred to as "add instruction" for brevity) illustrates storing an arithmetic result of adding a value of the register r0 by 8 into a register r5, and the instruction shown in a third row of Table 1 (referred to as "second load instruction" for brevity) illustrates loading data of an address [r9] within the cache memory 151 into a register r1.

TABLE 2

| | ID | EX | MEM | WB |
| --- | --- | --- | --- | --- |
| First cycle | Add | Load | | |
| Second cycle | Add | Bubble | Load | |
| Third cycle | Load | Add | Bubble | Load |

Table 2 is a schedule of the three instructions shown in Table 1 during three cycles of the pipeline architecture, where the instruction decoding stage, the instruction execution stage, the memory access stage and the data write back stage mentioned above are labeled, respectively, "ID", "EXE", "MEM" and "WB" in Table 2. In a first cycle, the first load instruction is in the instruction execution stage and the add instruction is in the instruction decoding stage. In a second cycle, the first load instruction stage enters the memory access stage. As data requested by the first load instruction is not yet obtained from the cache memory 151, the apparatus 100 may delay the time of the add instruction entering the instruction execution stage, making a "bubble" occur between the first load instruction and the add instruction. In a second cycle, as the first load instruction enters the data write back stage (which means the data of the register r0 is ready), the add instruction may enter the instruction execution stage to perform associated operations, and the second load instruction may enter the instruction decode stage.

As the first load instruction and the add instruction mentioned above are a pair of load-use instructions (e.g. the add instruction involves the first load instruction, and the first load instruction and the add instruction are executed back-to-back), the add instruction is unable to enter the instruction execution stage until the data corresponding to the load instruction is ready, thereby resulting in load-use stall, which impacts the overall operation efficiency.

Figure 2:
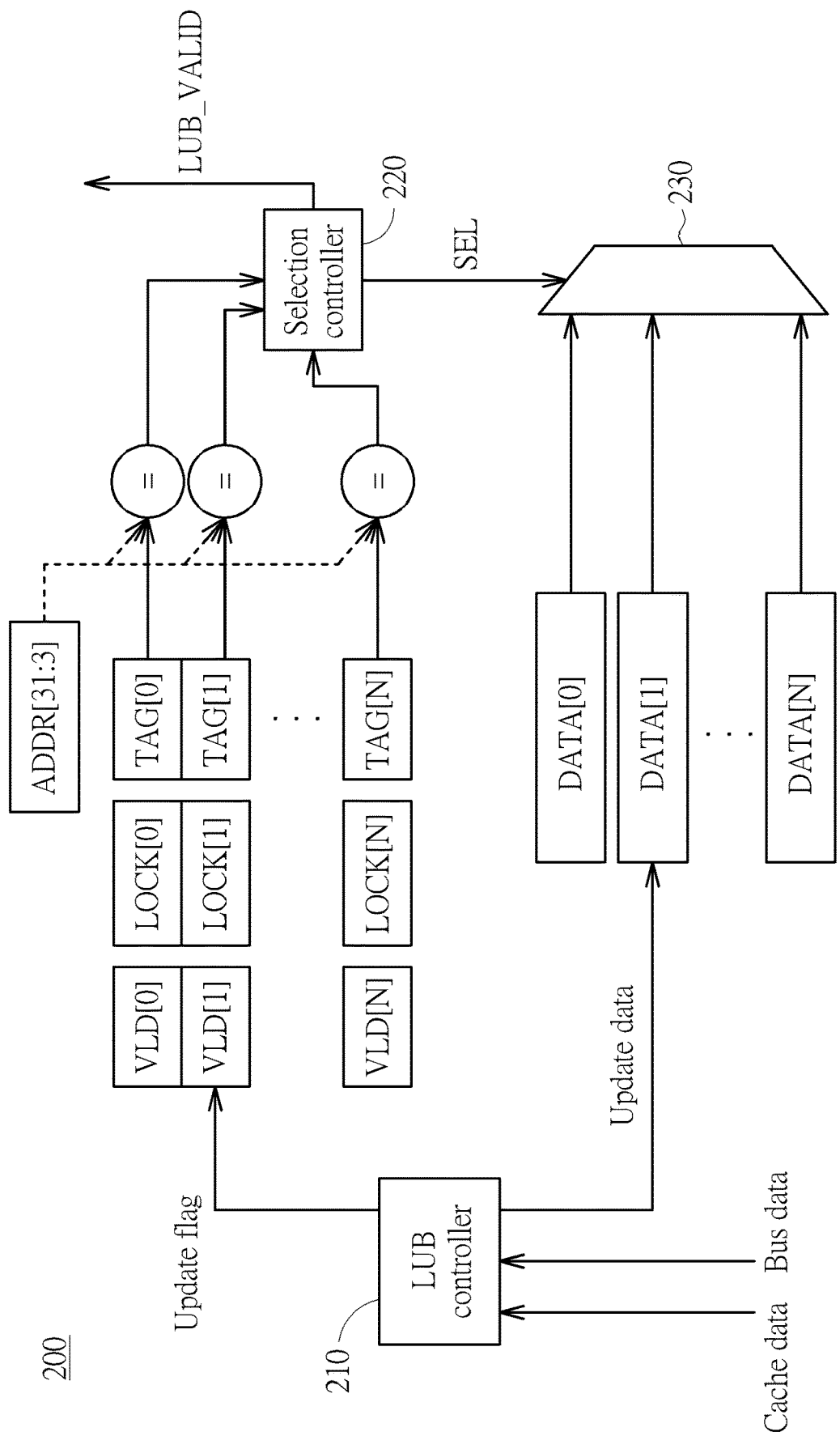
FIG. 2 is a diagram illustrating a load-use data buffer according to an embodiment of the present invention.

FIG. 2 is a diagram illustrating a load-use data buffer 200 according to an embodiment of the present invention. In this embodiment, the load-use data buffer 200 may provide a data register space, where the data register space within the load-use data buffer 200 may take flip-flops as storage units for a purpose of single cycle access. For example, when an access address is received, the load-use data buffer 200 may respond with corresponding data in a current cycle for being used by subsequent instructions. Based on the above features, the load-use data buffer 200 may be configured to remove the load-use bubble caused by the load-use instruction pair mentioned above (e.g. the first load instruction and the add instruction which is executed back-to-back). In this embodiment, the load-use data buffer 200 may comprise a data storage region and a tag storage region, where N sets of data (N may be a positive integer) such as DATA[0], DATA[1], . . . and DATA[N] may be stored in N entries of the data storage region, where N addresses respectively correspond to the N sets of data, such as TAG[0], TAG[1], . . . and TAG[N], which may be respectively stored in N entries of the tag storage region. In addition, a state of each entry of the N entries of the tag storage region may be determined by a corresponding valid bit VLD and a corresponding lock bit LOCK. For example, when a valid bit of a certain entry is "1", it means an address stored by this entry and corresponding data are valid or useable; and when the valid bit of this entry is "0", it means the address stored by this entry and the corresponding data are invalid or not useable. In another example, when a lock bit of a certain entry is "1", it means an address stored in this entry and corresponding data is in a locked state (e.g. is being updated and is not allowed to be used); and when the lock bit of this entry is "1", it means the address stored in this entry and the corresponding data is not in the locked state. In particular, a valid bit VLD[0] and a lock bit LOCK[0] may represent states of a tag address TAG[0] and data DATA[0], a valid bit VLD[1] and a lock bit LOCK[1] may represent states of a tag address TAG[1] and data DATA[1], and the rest may be deduced by analogy, e.g. a valid bit VLD[N] and a lock bit LOCK[N] may represent states of a tag address TAG[N] and data DATA[N].

In this embodiment, when the load-use data buffer 200 receives an access address ADDR, the load-use data buffer 200 may compare at least one portion of the access address ADDR with tag addresses of the tag storage region of the load-use data buffer 200 one by one, in order to confirm whether data requested by the access address ADDR is stored in the load-use data buffer 200. For example, when each set of data of the N sets of data comprises 64 bits, the load-use data buffer 200 may compare a range from a $31^{st}$ bit to a $3^{rd}$ bit of the access address ADDR (which may be represented by ADDR[31:3]) with the tag addresses TAG[0], TAG[1], ... and TAG[N] one by one in order to generate N comparison results. In addition, a selection controller 220 within the load-use data buffer 200 may generate a valid signal LUB_VALID according to the N comparison results (e.g. performing logic processing on the N comparison results to generate the valid signal LUB_VALID), where if any of the N comparison results indicates a comparison result of "hit", the valid signal LUB_VALID may indicate that the load-use data buffer 200 is hit (which means the data requested by the access address ADDR can be found in the load-use data buffer 200). More particularly, when the valid signal LUB_VALID indicates that the load-use data buffer 200 is hit, the selection controller 220 may generate a selection signal SEL according to the N comparison results, to make a selection circuit such as a multiplexer (MUX) 230 within the load-use data buffer 200 select a corresponding entry to output corresponding data according to the selection signal SEL. If all of the N comparison result indicate a result of "miss", it means the data requested by the access address ADDR is not stored in the load-use data buffer 200, and a load-use buffer (LUB) controller 210 within the load-use data buffer 200 may obtain cache data from the cache memory or obtain the bus data from external device(s) via the bus interface unit 170, but the present invention is not limited thereto.

When the LUB controller 210 obtains new data requested by the access address ADDR from the cache memory 151 or an external memory, the LUB controller 210 may store this new data into the data storage region of the load-use data buffer 200. Accordingly, if the load-use data buffer 200 receives the access address ADDR again in the future, the load-use data buffer 200 can quickly provide this new data. It should be noted that, if a storage space of the load-use data buffer 200 is full, the LUB controller 210 may need to discard one of the entries according to an update replacement scheme, in order to provide a storage space for this new data. Thus, each set of data of the N sets of data may correspond to a weighting value, and the weighting value may be utilized for determining a frequency of corresponding data being used, to make the LUB controller 210 update data accordingly. For example, a certain set of data of the N sets of data may have a lower weighting value because it has not been used in a long time, and another set of data of the N sets of data may have a higher weighting value because it is frequently used. When the storage space within the load-use data buffer 200 is full and the LUB controller 210 still decides to store a new set of data (which is not yet stored in the load-use data buffer 200) into the load-use data buffer 200, the LUB controller 210 may select a set of data which has the lowest weighting value among the N sets of data to be discarded and replaced with the new set of data mentioned above. Thus, the present invention can make the data which is frequently used be stored in the load-use data buffer (which has a higher access speed) with the aid of temporal locality of data, thereby improving an overall performance of the apparatus 100.

TABLE 3

| | | |
|---|---|---|
| i0 | Initial | r2, 10; |
| i1 | Load | r1, [r0], #16; |
| i2 | Add | r5, r4, r1; |
| i3 | Add | r3, r1, r2; |
| i4 | Subtract | r2, r2, 1; |
| i5 | Return | i1 |

Table 3 is an example of another instruction set, where the instruction set shown in Table 3 comprises six instructions and are sequentially numbered i0, i1, i2, i3, i4 and i5. The instruction i0 represents writing a value "10" into a register r2 to be an initial value. The instruction i1 represents loading data of an address [r0] of the cache memory 151 into a register r1. The instruction i2 represents writing a result of adding a value of a register r4 to a value of a register r1 into a register r5. The instruction i3 represents writing a result of adding the value of the register r1 to the value of the register r2 into a register r3. The instruction i4 represents writing a result of subtracting a value "1" from the value of the register r2 into the register r2. The instruction i5 represents the program flow returns to the instruction i1. As shown in Table 3, the instructions i1 and i2 are a pair of load-use instructions. The load-use data buffer 200 shown in FIG. 2 is unable to avoid load-use stall occurring in the instruction set shown in Table 3. In detail, the instruction i2 may add 16 to the previous base address [r0] to be a target address when the instruction i2 is executed. For example, in a first cycle, the instruction i2 loads data of the address [r0] of the cache memory 151 into the register r1; and in a second cycle, the instruction i2 load data of an address [r0+16] of the cache memory 151 into the register r1. Although the instruction i2 is repeatedly executed, the target address may be shifted by "16" every time. Thus, the load-use data buffer 200 may always obtain the result of "miss" and is unable to avoid the occurrence of the load-use stall.

Figure 3:
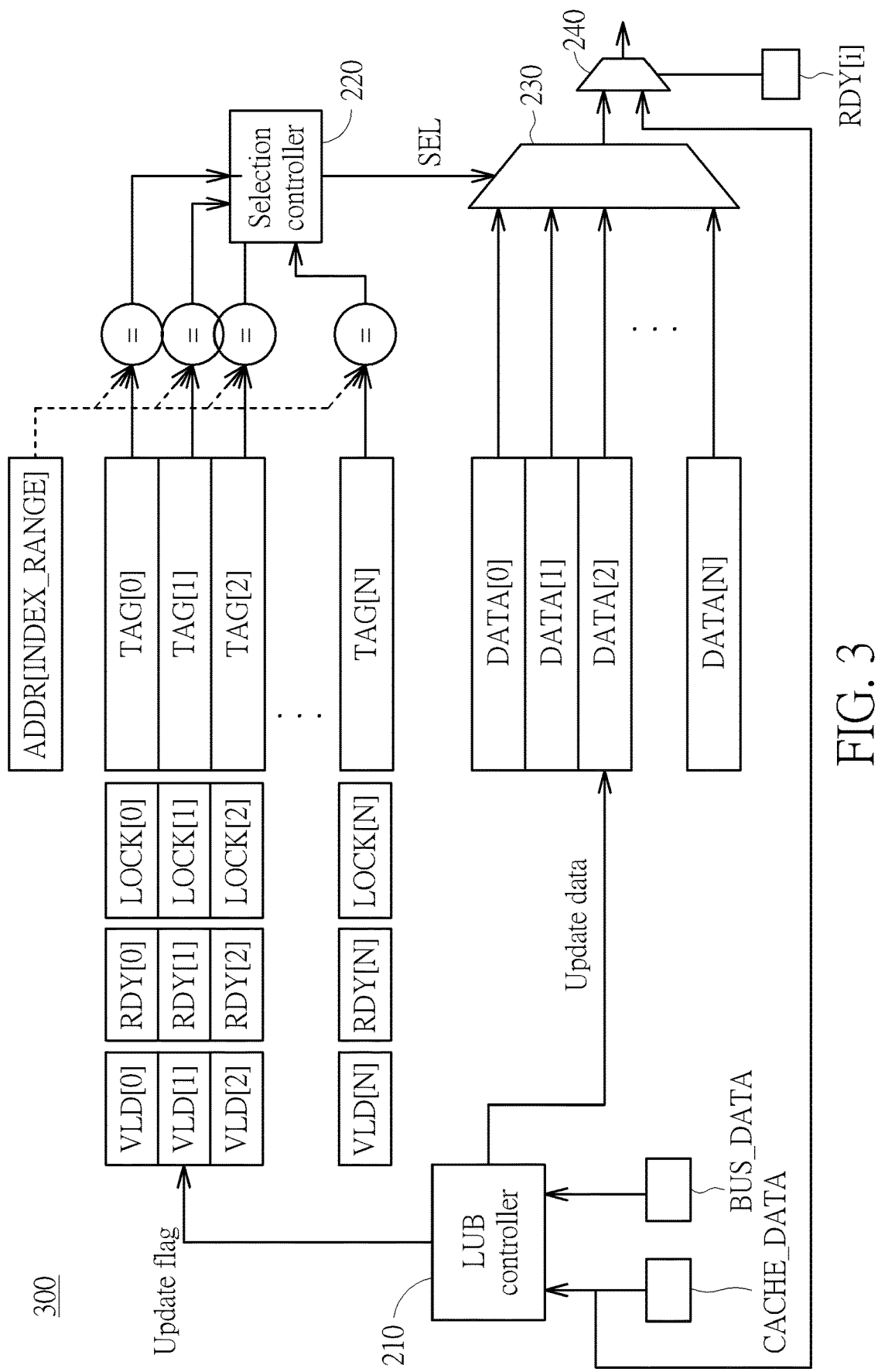
FIG. 3 is a diagram illustrating a load-use data buffer according to another embodiment of the present invention.

FIG. 3 is a diagram illustrating a load-use data buffer 300 according to an embodiment of the present invention, where the load-use data buffer 300 may be regarded as an enhanced version of the load-use data buffer 200 shown in FIG. 2. In particular, the load-use data buffer 300 is obtained by improving state bits of each entry of the N entries of the tag storage region based on the architecture of the load-use data buffer 200. For example, in addition to the valid bit VALID and the lock bit LOCK, the state of each entry of the N entries may be determined further according to a ready bit RDY such as RDY[0], RDY[1], RDY[2], ... and RDY[N]. The load-use data buffer 300 may further comprise a selection circuit such as a MUX 240, where the MUX 240 is coupled to a data register space within the load-use data buffer 300 through an internal path, and is further coupled to the cache memory 151 outside the load-use data buffer 300 through a bypass path. When the data register space of the load-use data buffer 300 is not stored the load data (e.g. all of the N comparison result generated by performing comparison on the access address ADDR[INDEX_RANGE] indicate the result of "miss"), the load-use data buffer 300 may select a certain entry such as an $i^{th}$ entry (where i is an integer within an interval from 0 to N) according to the update replacement scheme mentioned above, to update data stored in the data register space such as data stored in the $i^{th}$ entry according to the load data. In this embodiment, a bit range INDEX_RANGE within the access address ADDR that is utilized for performing comparison may vary according to a size of data stored in each entry, where related details are omitted here for brevity. If the load data can be found in the cache memory 151, the LUB controller 210 may obtain the load data (illustrated by cache data CACHE_DATA in FIG. 3) from the cache memory; and if the load data is unable to be found in the cache memory 151, the LUB controller 210 may obtain the load data (illustrated by bus data BUS_DATA in FIG. 3) through the bus interface unit 170.

It should be noted that data update regarding a selected entry is unable to be completed immediately after the LUB controller 210 obtains the cache data CACHE_DATA. In this embodiment, the MUX 230 may select one of the internal path and the bypass path according to a ready bit of the selected entry (e.g. a ready bit RDY[i] of the $i^{th}$ entry), in order to provide load data requested by a load instruction (e.g. the first load instruction mentioned above) to the ALU 140 in the instruction execution stage. For example, when the data register space of the load-use data buffer 300 does not store the load data but the cache memory 151 store the load data, the LUB controller 210 may update the ready bit RDY[i] of the $i^{th}$ entry from "0" to "1", and the MUX 240 may enable the bypass path to allow the ALU 140 to obtain the load data such as the cache data CACHE_DATA from the cache memory 151 under a condition where operations of updating the data stored in the data register space (e.g. the data of the $i^{th}$ entry) are not completed. In another example, when the data register space of the load-use data buffer 300 stores the load data, the ready bit RDY[i] may be maintained at "0", and the MUX 230 may enable the internal path to allow the ALU 140 to obtain the load data from the data register space.

Figure 4:
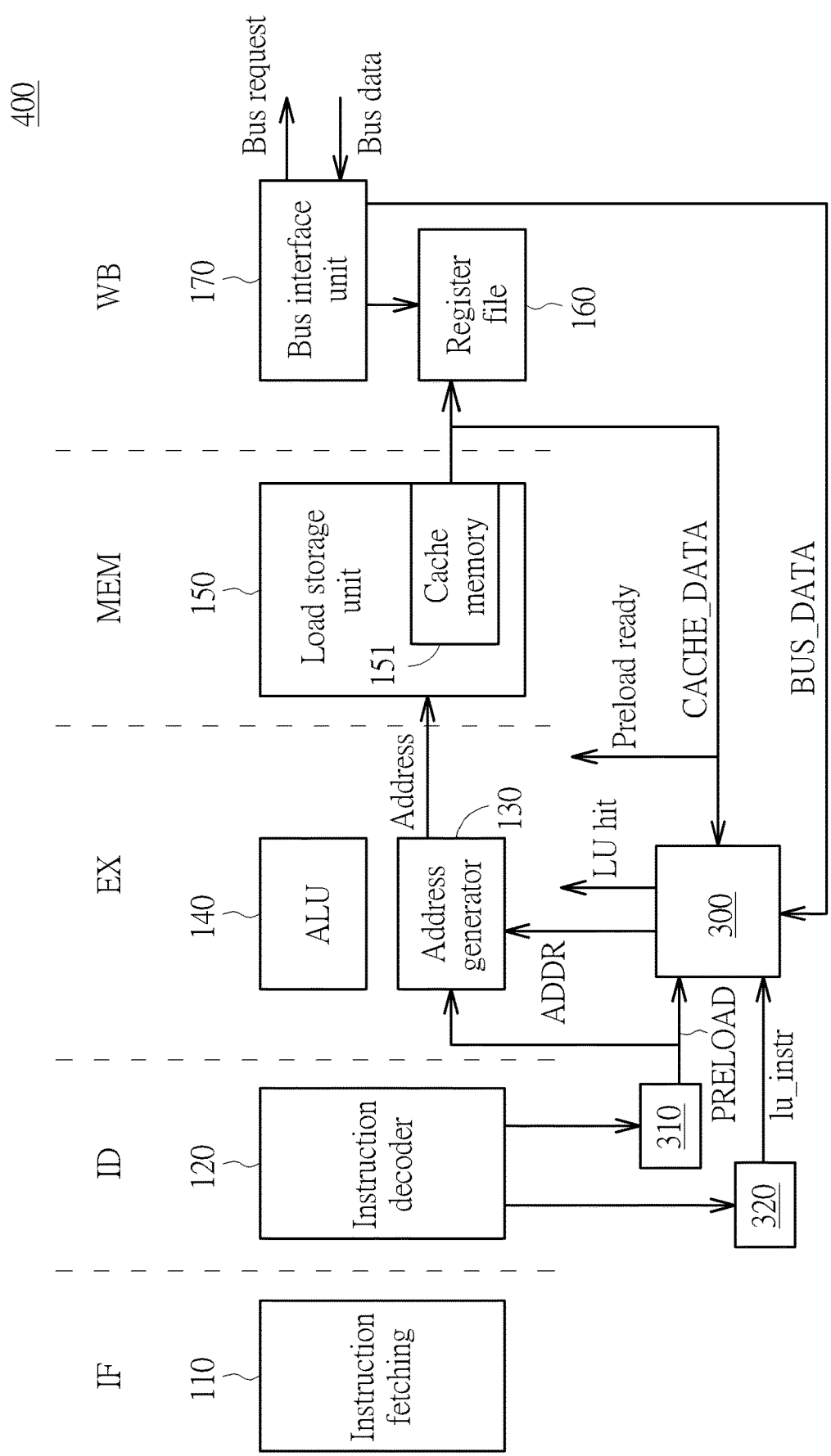
FIG. 4 is a diagram illustrating an apparatus operating under instruction pipeline architecture according to an embodiment of the present invention.

FIG. 4 is a diagram illustrating an apparatus 400 such as a CPU operating under the instruction pipeline architecture according to an embodiment of the present invention, where the apparatus 400 may be regarded as an enhanced version of the apparatus 100 shown in FIG. 1. In this embodiment, the apparatus 400 may comprise a preload predictor 310, a load-use instruction detector 320, and the load-use data buffer 300 shown in FIG. 3. The preload predictor 310 may be configured to determine whether a load instruction conforms to at least one specific condition, to generate a preload determination result PRELOAD. The load-use data buffer 300 may be coupled to the preload predictor 310, and may be further coupled to the ALU 140 for providing data to be used by the ALU 140. In addition, the load-use instruction detector 320 may detect whether the load instruction and a subsequent instruction following the load instruction are a load-use instruction pair, in order to generate a load-use detection result lu_instr, where when the load-use detection result lu_instr indicates that the load instruction and the subsequent instruction are the load-use instruction pair, it means the subsequent instruction involves the data requested by the load instruction.

When an instruction set comprises multiple load instructions and access addresses corresponding to these load instructions are arranged in an ascending order or a descending order, e.g. the instruction i1 which would be repeatedly executed as shown in Table 3, the apparatus 100 is unable to avoid bubbles being generated in the instruction pipeline schedule even though the load-use data buffer 200 shown in FIG. 2 is utilized. In this embodiment, when the preload determination result PRELOAD indicates that the load instruction conforms to the at least one specific condition, the load-use data buffer 300 may fetch preload data from the cache memory 151 according to information carried by the load instruction and store the preload data into the load-use data buffer 300, where the preload data is data requested by a subsequent load instruction. For example, when the preload predictor 310 detects load instruction which are arranged in ascending order or descending order as mentioned above, and the load-use instruction detector 320 detects that the load instruction and the subsequent instruction are the load-use instruction pair, the preload predictor 310 may send a preload request to the load-use data buffer 300, and the LUB controller 210 may accordingly trigger a preload procedure to access the load-use data buffer 300 according to load-use information obtained in the instruction decoding stage. When the comparison result of the load-use data buffer 300 regarding the access address ADDR is "hit" (labeled "LU hit" in FIG. 4), the load-use data buffer 300 may output target data when the load instruction is in the instruction execution stage, to allow the ALU 140 to obtain the target data when the subsequent instruction enters the instruction execution stage. When the target data requested by the load instruction is not found in the load-use data buffer 300, the preload request may check whether the target data is able to be found in the cache memory 151 in the memory access stage, where if the cache memory 151 is hit (which means the target data is found in the cache memory 151), the target data (e.g. the cache data CACHE_DATA) may be preloaded to the load-use data buffer 300 first, and may further utilize the control of the ready bit RDY[i] shown in FIG. 3 to directly output the target data (labeled "Preload ready"). When the cache memory 151 is missed (which means the target data is not found in the cache memory 151), the apparatus 400 may send a bus request through the bus interface unit 170, to obtain the target data (labeled "bus data") from external storage devices.

Figure 5:
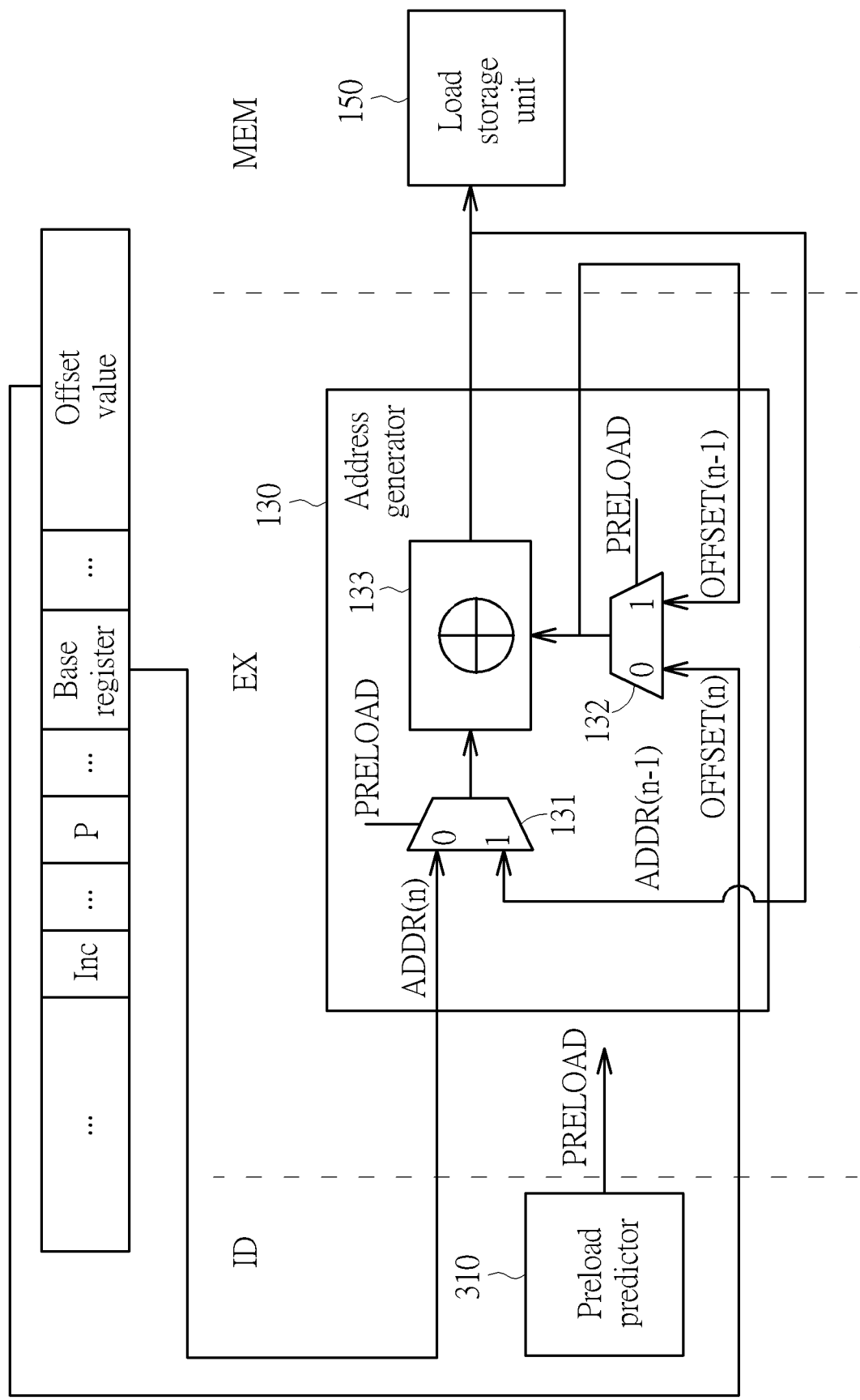
FIG. 5 is a diagram illustrating details of a load instruction under the instruction pipeline architecture shown in FIG. 4 according to an embodiment of the present invention.

FIG. 5 is a diagram illustrating details of a load instruction under the instruction pipeline architecture shown in FIG. 4 according to an embodiment of the present invention, where FIG. 5 only shows the instruction decoding stage, the instruction execution stage and the memory access stage for brevity. In this embodiment, the preload predictor 310 generates the preload determination result PRELOAD according to at least one field of the load instruction, and the preload determination result PRELOAD indicates whether a load address corresponding to the load instruction is to be updated after execution of the load instruction is completed, where the preload data corresponds to an updated load address generated by updating the load address, and when the preload determination result PRELOAD indicates that the load address is to be updated after execution of the load instruction is completed, the load instruction conforms to the at least one specific condition. In this embodiment, when a post-increment field or a post-decrement field is obtained after the load instruction is decoded, it means the load instruction conforms to the at least one specific condition, where the aforementioned post-increment field may comprise a field Inc and a field P, and the aforementioned post-decrement field may comprise a field Dec and a field P. Furthermore, the load instruction may carry a base address (labeled "Base register") and an offset value after being decoded, and when the preload determination result PRELOAD indicates that the load address is to be updated after execution of the load instruction is completed, the updated load address is equal to the load address plus the offset value or the load address minus the offset value. For example, if the field Inc and the field P are obtained after the load instruction is decoded, the load instruction will be updated as the base address plus the offset value after execution of the load instruction is completed; and if the field Dec and the field P are obtained after the load instruction is decoded, the load instruction will be updated as the base address minus the offset value after execution of the load instruction is completed.

In this embodiment, the address generator 130 may generate the load address corresponding to the load instruction according to the preload determination result PRELOAD. As shown in FIG. 5, the address generator 130 may comprise a first selector such as a MUX 131, a second selector such as a MUX 132, and a summing circuit 133 coupled to the MUXs 131 and 132. The MUX 131 may be configured to select a final base address from a base address ADDR(n) carried by the load instruction and a previous load address ADDR(n−1) carried by a previous load instruction, and the MUX 132 may be configured to select a final offset value from an offset value OFF SET(n) carried by the load instruction and a previous offset value OFF SET(n−1) carried by the previous load instruction, where the summing circuit 133 is configured to generate the load address (which may be referred to as "final address") by adding the final offset to the final base address or subtracting the final offset from the final base address. More particularly, when the preload determination result PRELOAD indicates that the load address is to be updated after execution of the load address is completed (e.g. a logic value of the preload determination result PRELOAD is "1"), the MUX 131 may select the previous load address ADDR(n−1) as the final base address, and the MUX 132 may select the previous offset value OFFSET(n−1) as the final offset value. In addition, when the preload determination result PRELOAD indicates that the load address is not to be updated after execution of the load address is completed (e.g. a logic value of the preload determination result PRELOAD is "0"), the MUX 131 may select the base address ADDR(n) as the final base address, and the MUX 132 may select the offset value OFFSET(n) as the final offset value. It should be noted that this embodiment takes the condition of obtaining the field Inc and the field P after the load instruction is decoded as an example for illustration purposes, but the present invention is not limited thereto. For those skilled in this art, related details of the condition of obtaining the field Dec and the field P after the load instruction is decoded may be deduced by analogy, and are therefore omitted here for brevity.

Table 4 is a schedule of some instructions of Table 3 in three cycles within the instruction pipeline architecture, where the instruction decoding stage, the instruction execution stage, the memory access stage and the data write back stage mentioned above are respectively labeled "ID", "EXE", "MEM" and "WB" in Table 4 for brevity. In a first cycle, the load instruction i1 loads data of an address 0x00 in the instruction execution stage, and the add instruction i2 is in the instruction decoding stage, where the load instruction i1 and the add instruction i2 are a pair of load-use instructions and access addresses of the load instruction i1 are arranged in the ascending order (e.g. the access address is shifted by 16 every time the execution is completed), and the preload predictor 310 may therefore send a preload request. In a second cycle, the load instruction i1 enters the memory access stage, the add instruction i2 enters the instruction execution stage, and the add instruction i2 enters the instruction decoding stage, where at the same time of the add instruction i2 being in the instruction execution stage, the preload request may preload data of the access address 0x10 (which is obtained by shifting the access address 0x00 by 16) into the load-use data buffer 300 (labeled "Preload 0x10"). In a third cycle, the load instruction i1 enters the data write back stage, the add instruction i2 enters the memory access stage, the add instruction i3 enters the instruction execution stage, and the subtract instruction i4 enters the instruction decoding stage. After several cycles, the return instruction i5 makes the program flow return to the load instruction i1. As the data of the access address 0x10 has been preloaded into the load-use data buffer 300, the load instruction i1 can obtain a result of the load-use data buffer 300 being hit (referred to as "LUB hit" for brevity) in an $M^{th}$ cycle (where M is a positive integer). Similarly, in an $(M+1)^{th}$ cycle, at the same time of the add instruction i2 in the instruction execution stage, the preload request may preload data of the access address 0x20 (which is obtained by shifting the access address 0x10 by 16) into the load-use data buffer 300 (labeled "Preload 0x20"), in order to obtain the result of LUB hit in a subsequent cycle. Operations from the $M^{th}$ cycle to the $(M+2)^{th}$ cycle are similar to operations from the first cycle to the third cycle, and are not repeated here for brevity.

It should be noted that the cache memory 151 is typically implemented by SRAMs, and the load-use data buffer 300 of the present invention can take flip-flops as storage units. Thus, speed of the ALU 140 fetching data from the load-use data buffer 300 is faster than speed of the ALU 140 fetching data from the cache memory 151. Based on this feature, when a certain load instruction obtains the result of LUB hit (i.e. data requested by this load instruction is able to be found in the load-use data buffer 300), the load-use data buffer 300 may output the data requested by this load instruction in a single cycle, thereby avoiding bubbles being generated in the instruction pipeline schedule. More particularly, when a certain load instruction is to be repeatedly executed and target addresses of every execution are arranged in ascending order or descending order, it means a target address of a load instruction to be executed is predictable. The preload predictor 310 of the present invention can send a preload request based on such spatial locality, in order to transfer data of the target addresses which are arranged in ascending order or descending order into the load-use data buffer 300 in advance, thereby avoiding the problem of load-use stalls.

Figure 6:
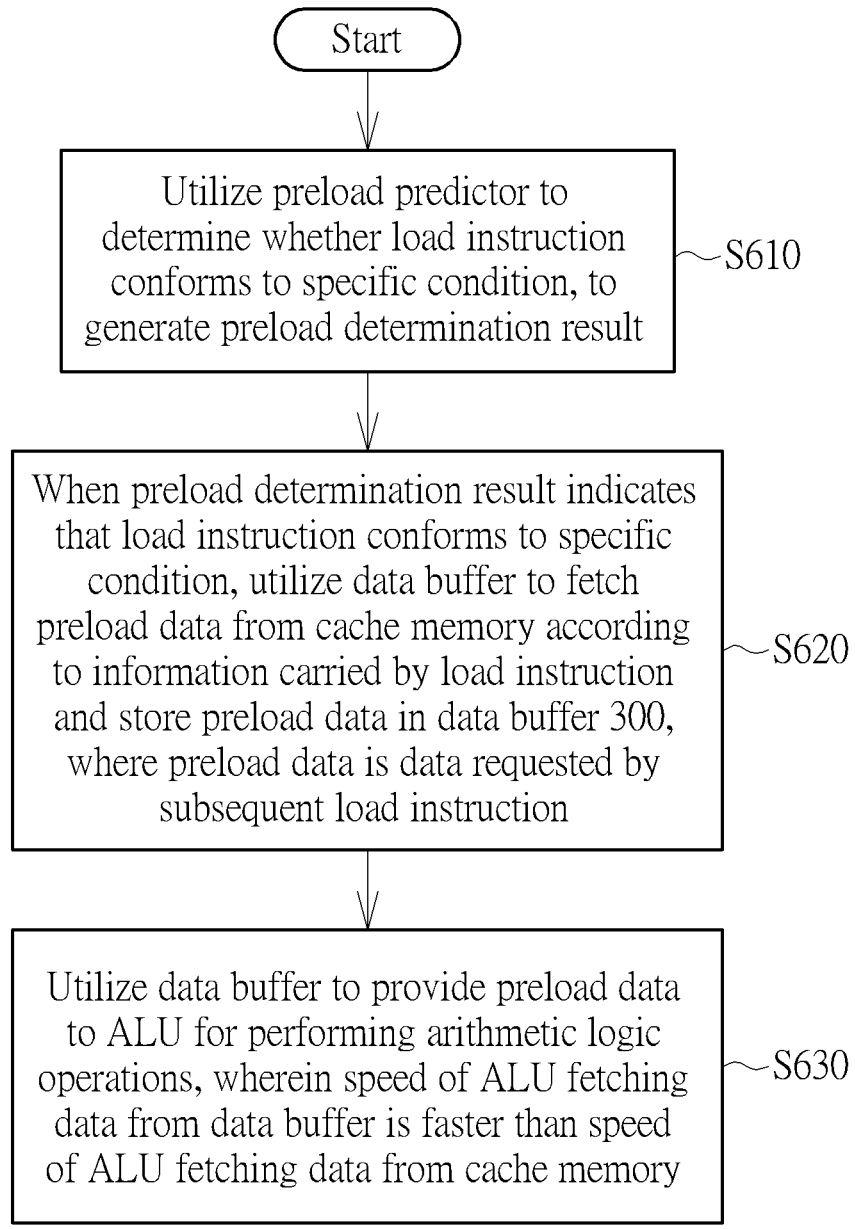
FIG. 6 is a diagram illustrating a working flow of a method for pipeline control according to an embodiment of the present invention.

FIG. 6 is a diagram illustrating a working flow of a method for pipeline control according to an embodiment of the present invention, where the method is applicable to the

TABLE 4

|  | ID | EX | MEM | WB |
| --- | --- | --- | --- | --- |
| First cycle | Add | Load 0x00 |  |  |
| Second cycle | Add | Add Preload 0x10 | Load |  |
| Third cycle | Subtract | Add | Add | Load |
| $M^{th}$ cycle | Add | Load 0x10 |  |  |
| $(M + 1)^{th}$ cycle | Add | Add Preload 0x10 | Load |  |
| $(M + 2)^{th}$ cycle | Subtract | Add | Add | Load | apparatus 400 shown in FIG. 4. It should be noted that the working flow shown in FIG. 6 is for illustrative purposes only, and is not meant to be a limitation of the present invention. More particularly, one or more steps may be added, deleted or modified in the working flow shown in FIG. 6. In addition, if an overall result is not hindered, these steps do not have to be executed in the exact order shown in FIG. 6.

In Step S610, the apparatus 400 may utilize the preload predictor 310 to determine whether a load instruction conforms to at least one specific condition, to generate the preload determination result PRELOAD.

In Step S620, when the preload determination result PRELOAD indicates that the load instruction conforms to the at least one specific condition, the apparatus 400 may utilize the load-use data buffer 300 to fetch preload data from the cache memory 151 according to information carried by the load instruction and store the preload data in the load-use data buffer 300, where the preload data is data requested by a subsequent load instruction.

In Step S630, the apparatus 400 may utilize the load-use data buffer 300 to provide the preload data to the ALU 140 for performing arithmetic logic operations, wherein speed of the ALU 140 fetching data from the load-use data buffer 300 is faster than speed of the ALU 140 fetching data from the cache memory 151.

Figure 7:
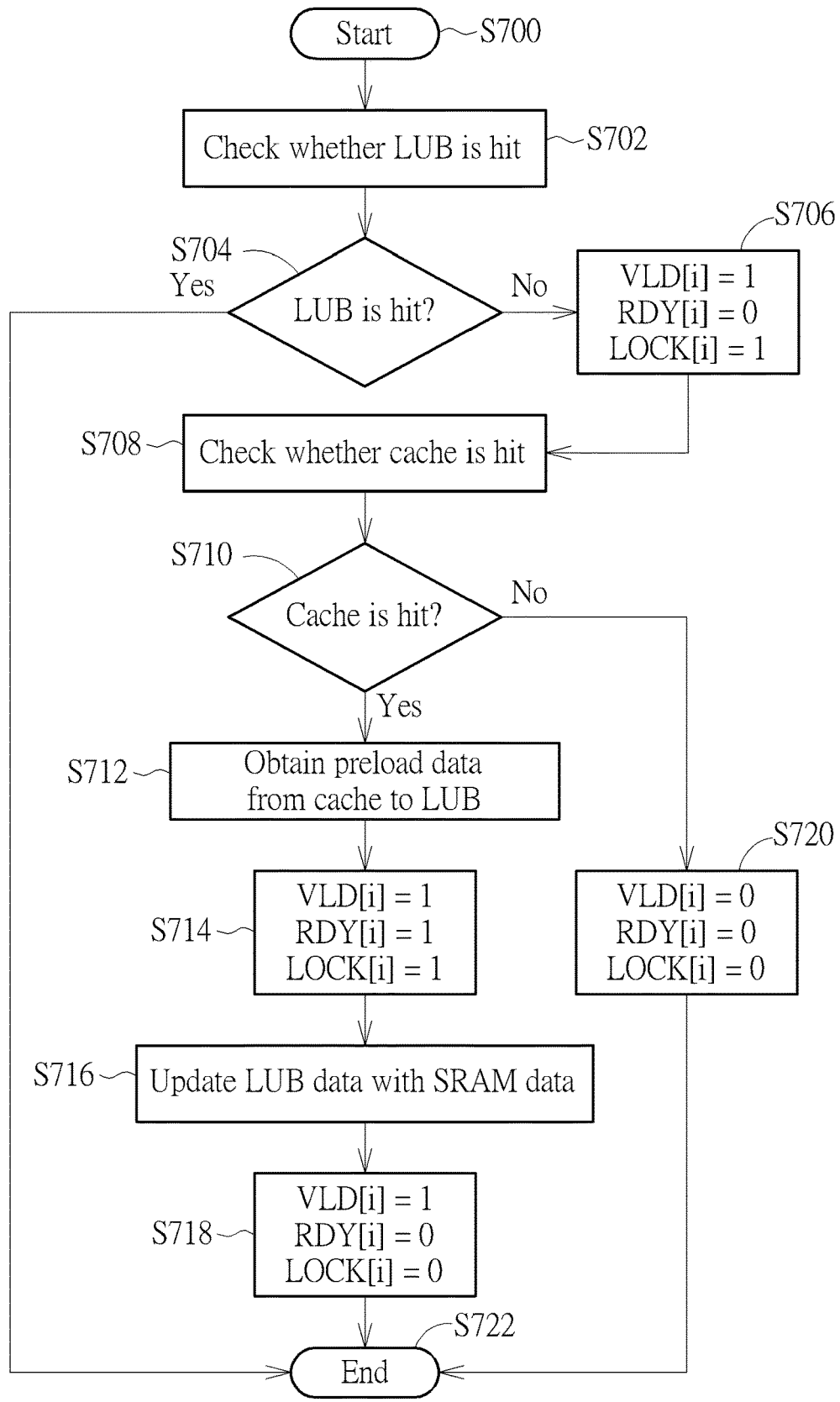
FIG. 7 is a diagram illustrating a working flow of executing a preload request according to an embodiment of the present invention.

FIG. 7 is a diagram illustrating a working flow of executing a preload request according to an embodiment of the present invention, where the preload request may be sent from the preload predictor 310 shown in FIG. 4, and the working flow shown in FIG. 7 may be controlled by the LUB controller 210 shown in FIG. 3, but the present invention is not limited thereto. It should be noted that the working flow shown in FIG. 7 is for illustrative purposes only, and is not meant to be a limitation of the present invention. More particularly, one or more steps may be added, deleted or modified in the working flow shown in FIG. 7. In addition, if an overall result is not hindered, these steps do not have to be executed in the exact order shown in FIG. 7.

In Step S700, the preload request starts.

In Step S702, the LUB controller 210 may check whether a LUB (e.g. the load-use data buffer 300) is hit, to generate a LUB check result.

In Step S704, if the LUB check result shows "Yes", the working flow proceeds with S722; and if the LUB check result shows "No", the working flow proceeds with Step S706.

In Step S706, the LUB controller 210 may set a valid bit VLD[i] to be "1", set a ready bit RDY[i] to be "0", and set a lock bit LOCK[i] to be "1".

In Step S708, the LUB controller 210 may check whether a cache (e.g. the cache memory 151) is hit, to generate a cache check result.

In Step S710, if the cache check result shows "Yes", the working flow proceeds with S712; and if the cache check result shows "No", the working flow proceeds with Step S720.

In Step S712, the LUB controller 210 may obtain preload data from the cache (e.g. the cache memory 151) to the LUB (e.g. the load-use data buffer 300).

In Step S714, the LUB controller 210 may set the valid bit VLD[i] to be "1", set the ready bit RDY[i] to be "1", and set the lock bit LOCK[i] to be "1".

In Step S716, the LUB controller 210 may update LUB data with SRAM data (e.g. the cache data CACHE_DATA).

In Step S718, the LUB controller 210 may set the valid bit VLD[i] to be "1", set the ready bit RDY[i] to be "0", and set the lock bit LOCK[i] to be "0".

In Step S720, the LUB controller 210 may set the valid bit VLD[i] to be "0", set the ready bit RDY[i] to be "0", and set the lock bit LOCK[i] to be "0".

In Step S722, the preload request ends.

Figure 8:
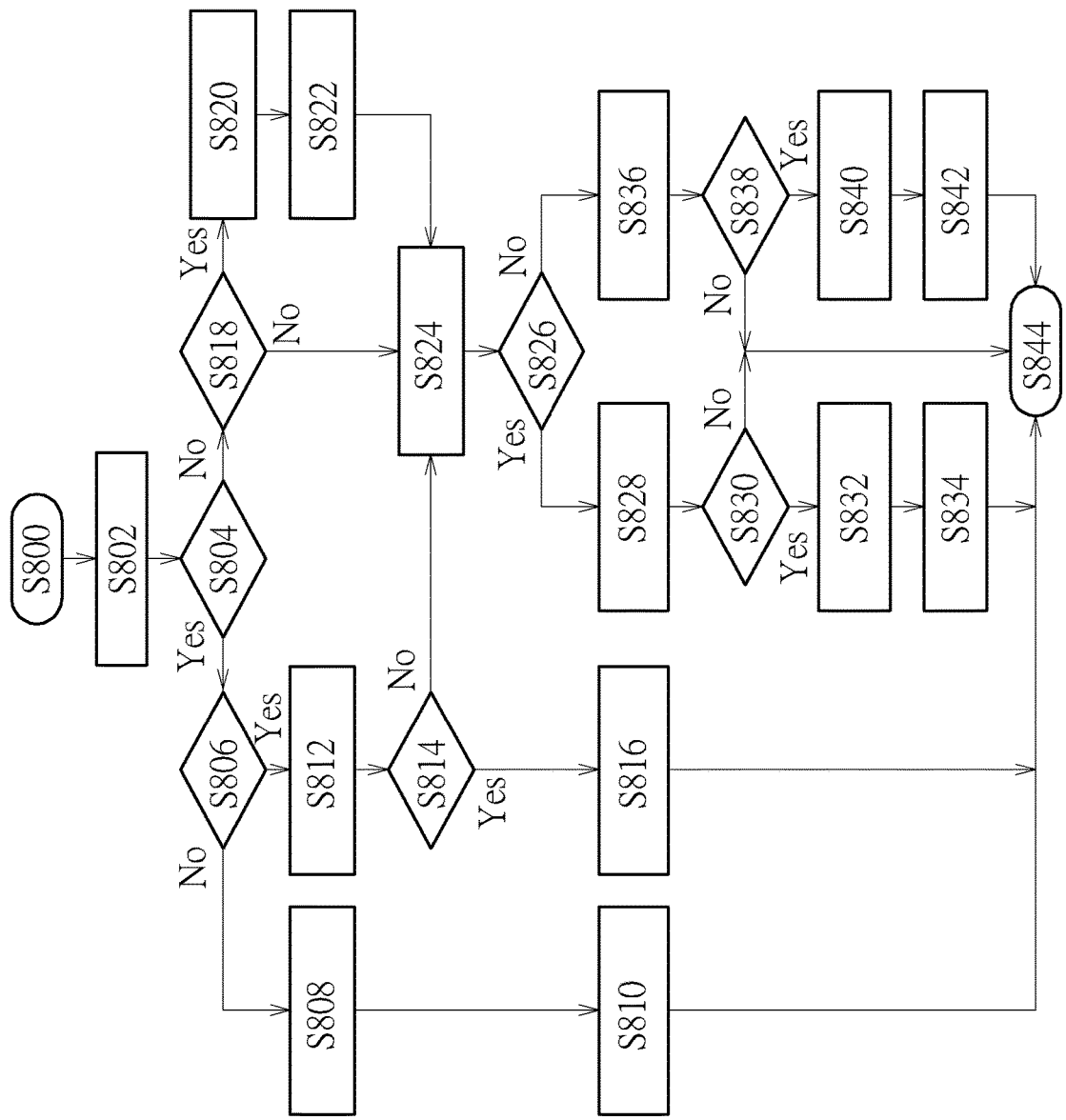
FIG. 8 is a diagram illustrating a working flow of executing a load instruction according to an embodiment of the present invention.

FIG. 8 is a diagram illustrating a working flow of executing a load instruction according to an embodiment of the present invention, where the load instruction is applicable to the apparatus 400 shown in FIG. 4. It should be noted that the working flow shown in FIG. 8 is for illustrative purposes only, and is not meant to be a limitation of the present invention. More particularly, one or more steps may be added, deleted or modified in the working flow shown in FIG. 8. In addition, if an overall result is not hindered, these steps do not have to be executed in the exact order shown in FIG. 8.

In Step S800, the load instruction starts.

In Step S802, the apparatus 400 may check whether a LUB (e.g. the load-use data buffer 300) is hit, to generate a LUB result.

In Step S804, if the LUB result shows "Yes", the working flow proceeds with Step S806; and if the LUB result shows "No", the working flow proceeds with Step S818.

In Step S806, the apparatus 400 may determine whether a lock bit LOCK[i] is "1". If the determination result shows "Yes", the working flow proceeds with Step S812; and if the determination result shows "No", the working flow proceeds with Step S808.

In Step S808, the apparatus 400 may update a replacement scheme (e.g. updating respective weighting values corresponding to respective entries mentioned above).

In Step S810, the apparatus 400 may utilize the load-use data buffer 300 to respond with LUB data (e.g. data of the entry which is hit in the load-use data buffer 300) to a core pipe and assert that the LUB data is valid (e.g. outputting the valid signal LUB_VALID with a logic value "1").

In Step S812, the apparatus 400 may check whether preloading of the LUB is in process (e.g. checking a ready bit RDY[i] of a corresponding entry).

In Step S814, the apparatus 400 may determine whether the ready bit RDY[i] is "1". If the determination result shows "Yes", the working flow proceeds with Step S816; and if the determination result shows "No", the working flow proceeds with Step S824.

In Step S816, the apparatus 400 may respond with SRAM data (e.g. the cache data CACHE_DATA fetched from the cache memory 151) to the core pipe and assert that the LUB data is valid (e.g. outputting the valid signal LUB_VALID with the logic value "1").

In Step S818, the apparatus 400 may determine whether the load instruction and a subsequent instruction are a load-use instruction pair. If the determination result shows "Yes", the working flow proceeds with Step S820; and if the determination result shows "No", the working flow proceeds with Step S824.

In Step S820, the apparatus 400 may select an entry index i (i.e. an $i^{th}$ entry) according to the replacement scheme (e.g. respective weighting values corresponding to respective entries mentioned above).

In Step S822, the apparatus 400 may set a lock bit LOCK[i] of the $i^{th}$ entry to be "1".

In Step S824, the apparatus 400 may check whether a cache is hit (e.g. whether the cache memory 151 is hit) to generate a cache check result.

In Step S826, if the cache check result shows "Yes", the working flow proceeds with S828; and if the cache check result shows "No", the working flow proceeds with Step S836.

In Step S828, the apparatus 400 may respond with cache data such as CACHE_DATA to the core pipe.

In Step S830, the apparatus 400 may determine whether the LUB is hit (e.g. whether the load-use data buffer 300 is hit). If the determination result shows "No", the working flow proceeds with Step S844; and if the determination result shows "Yes", the working flow proceeds with Step S832.

In Step S832, the apparatus 400 may update LUB data (e.g. DATA[i] of the $i^{th}$ entry) with the SRAM data (e.g. the cache data CACHE_DATA).

In Step S834, the apparatus 400 may set a lock bit LOCK[i] of the ith entry to be "0".

In Step S836, the apparatus 400 may send a request such as a bus request to a bus through a bus interface unit 170, and respond with bus data obtained by the bus interface unit 170 to the core pipe.

In Step S838, the apparatus 400 may determine whether the LUB is hit (e.g. whether the load-use data buffer 300 is hit). If the determination result shows "No", the working flow proceeds with Step S844; and if the determination result shows "Yes", the working flow proceeds with Step S840.

In Step S840, the apparatus 400 may update the LUB data (e.g. DATA[i] of the $i^{th}$ entry) with the bus data.

In Step S842, the apparatus 400 may set the lock bit LOCK[i] of the $i^{th}$ entry to be "0".

In Step S844, the load instruction ends.

To summarize, based on the temporal locality (e.g. some sets of data are used recently or frequently) and the spatial locality (e.g. data of some addresses are predicted to be used), the present invention can transfer in advance some sets of data to a load-use data buffer which has higher access speed, to ensure that bubbles are less likely to occur in instruction pipeline operations when executing load-use instruction pairs, thereby reducing the possibility of occurrence of load-use stalls. More particularly, the embodiments of the present invention will not greatly increase additional costs. Thus, the present invention can solve the problem of the related art without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for pipeline control, comprising:
   a preload predictor, configured to determine whether a load instruction conforms to at least one specific condition, to generate a preload determination result;
   an arithmetic logic unit (ALU), configured to perform arithmetic logic operations; and
   a data buffer, coupled to the preload predictor and the ALU, configured to provide data for being used by the ALU, wherein speed of the ALU fetching data from the data buffer is faster than speed of the ALU fetching data from a cache memory;
   wherein when the preload determination result indicates that the load instruction conforms to the at least one specific condition, the data buffer fetches preload data from the cache memory according to information carried by the load instruction and stores the preload data in the data buffer, and the preload data is data requested by a subsequent load instruction;
   wherein the preload predictor generates the preload determination result according to at least one field of the load instruction, and the preload determination result indicates whether a load address corresponding to the load instruction is to be updated after execution of the load instruction is completed, wherein the preload data correspond to an updated load address generated by updating the load address.

2. The apparatus of claim 1, wherein the data buffer comprises:
   a selection circuit, coupled to a data register space within the data buffer through an internal path, and coupled to the cache memory outside the data buffer through a bypass path;
   wherein the selection circuit selects one of the internal path and the bypass path for providing load data requested by the load instruction to the ALU.

3. The apparatus of claim 2, wherein when the data register space of the data buffer stores the load data, the selection circuit enables the internal path to allow the ALU to obtain the load data from the data register space.

4. The apparatus of claim 2, wherein when the data register space of the data buffer does not store the load data, the data buffer updates data in the data register space, and the selection circuit enables the bypass path to allow the ALU to obtain the load data from the cache memory under a condition where operations of updating the data in the data register space are not completed.

5. The apparatus of claim 1, wherein when the preload determination result indicates that the load address is to be updated after the execution of the load instruction is completed, the load instruction conforms to the at least one specific condition.

6. The apparatus of claim 1, wherein the load instruction carries an offset value, and when the preload determination result indicates that the load address is to be updated after the execution of the load instruction is completed, the updated load address is equal to the load address plus the offset value or the load address minus the offset value.

7. The apparatus of claim 6, further comprising:
   an address generator, configured to generate the load address according to the preload determination result, wherein the address generator comprises:
   a first selection circuit, configured to select a final base address from a base address carried by the load instruction and a previous load address corresponding to a previous load instruction;
   a second selection circuit, configured to select a final offset value from the offset value carried by the load instruction and a previous offset value carried by the previous load instruction; and
   a summing circuit, coupled to the first selection circuit and the second selection circuit, configured to generate the load address by adding the final offset to the final base address or subtracting the final offset from the final base address.

8. The apparatus of claim 7, wherein when the preload determination result indicates that the load address is to be updated after the execution of the load instruction is completed, the first selection circuit selects the previous load address to be the final base address, and the second selection circuit selects the previous offset value to be the final offset value.

9. A method for pipeline control, comprising:
utilizing a preload predictor to determine whether a load instruction conforms to at least one specific condition, to generate a preload determination result;
in response to the preload determination result indicating that the load instruction conforms to the at least one specific condition, utilizing a data buffer to fetch preload data from a cache memory according to information carried by the load instruction and store the preload data in the data buffer, wherein the preload data is data requested by a subsequent load instruction; and
utilizing the data buffer to provide the preload data to an arithmetic logic unit (ALU) for performing arithmetic logic operations, wherein speed of the ALU fetching data from the data buffer is faster than speed of the ALU fetching data from the cache memory;
wherein the preload determination result is generated according to at least one field of the load instruction, and the preload determination result indicates whether a load address corresponding to the load instruction is to be updated after execution of the load instruction is completed, wherein the preload data correspond to an updated load address generated by updating the load address.

10. The method of claim 9, wherein the data buffer comprises a selection circuit, the selection circuit is coupled to a data register space within the data buffer through an internal path and is coupled to the cache memory outside the data buffer through a bypass path, and the method further comprises:
utilizing the selection circuit to select one of the internal path and the bypass path for providing load data requested by the load instruction to the ALU.

11. The method of claim 10, wherein utilizing the selection circuit to select one of the internal path and the bypass path for providing the load data requested by the load instruction to the ALU comprises:
in response to the data register space of the data buffer storing the load data, utilizing the selection circuit to enable the internal path to allow the ALU to obtain the load data from the data register space.

12. The method of claim 10, wherein utilizing the selection circuit to select one of the internal path and the bypass path for providing the load data requested by the load instruction to the ALU comprises:
in response to the load data not being stored in the data register space of the data buffer, utilizing the data buffer to update data in the data register space, and utilizing the selection circuit to enable the bypass path to allow the ALU to obtain the load data from the cache memory under a condition where operations of updating the data in the data register space are not completed.

13. The method of claim 9, wherein when the preload determination result indicates that the load address is to be updated after the execution of the load instruction is completed, the load instruction conforms to the at least one specific condition.

14. The method of claim 9, wherein the load instruction carries an offset value, and when the preload determination result indicates that the load address is to be updated after the execution of the load instruction is completed, the updated load address is equal to the load address plus the offset value or the load address minus the offset value.

15. The method of claim 14, further comprising:
utilizing an address generator to generate the load address according to the preload determination result, wherein the address generator comprises:
a first selection circuit, configured to select a final base address from a base address carried by the load instruction and a previous load address corresponding to a previous load instruction;
a second selection circuit, configured to select a final offset value from the offset value carried by the load instruction and a previous offset value carried by the previous load instruction; and
a summing circuit, coupled to the first selection circuit and the second selection circuit, configured to generate the load address by adding the final offset to the final base address or subtracting the final offset from the final base address.

16. The method of claim 15, wherein utilizing the address generator to generate the load address according to the preload determination result comprises:
in response to the preload determination result indicating that the load address is to be updated after the execution of the load instruction is completed, utilizing the first selection circuit to select the previous load address to be the final base address, and utilizing the second selection circuit to select the previous offset value to be the final offset value.

* * * * *